United States Patent
Zhu et al.

(10) Patent No.: US 9,521,653 B2
(45) Date of Patent: Dec. 13, 2016

(54) METHOD FOR TRANSMITTING CONTROL INFORMATION

(71) Applicant: Huawei Technologies Co., Ltd., Shenzhen (CN)

(72) Inventors: Song Zhu, Beijing (CN); Yue Li, Shenzhen (CN); Bin Zhen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/272,142

(22) Filed: May 7, 2014

(65) Prior Publication Data

US 2014/0241234 A1 Aug. 28, 2014

Related U.S. Application Data

(63) Continuation of application No. PCT/CN2012/084189, filed on Nov. 7, 2012.

(30) Foreign Application Priority Data

Nov. 7, 2011 (CN) .......................... 2011 1 0348298

(51) Int. Cl.
*H04W 72/00* (2009.01)
*H04W 74/00* (2009.01)
(Continued)

(52) U.S. Cl.
CPC ......... *H04W 72/005* (2013.01); *H04W 74/006* (2013.01); *H04W 72/085* (2013.01); *H04W 74/0833* (2013.01)

(58) Field of Classification Search
CPC .................................................. H04W 72/005
(Continued)

(56) References Cited

U.S. PATENT DOCUMENTS

| | | | | |
|---|---|---|---|---|
| 2004/0013103 A1* | 1/2004 | Zhang | ................... | H04L 1/0026 370/345 |
| 2007/0177541 A1* | 8/2007 | Kwon | ................... | H04W 72/04 370/329 |

(Continued)

FOREIGN PATENT DOCUMENTS

| | | |
|---|---|---|
| CN | 101400101 A | 4/2009 |
| CN | 101626280 A | 1/2010 |

(Continued)

OTHER PUBLICATIONS

Samsung, "Low-Cost MTC UEs based on LTE," 3GPP TSG RAN WG1 #66bis, R1-113101, Zhuhai, China, Oct. 10-14, 2011, 4 pages.
(Continued)

*Primary Examiner* — Andrew Lai
*Assistant Examiner* — Andrew C Lee
(74) *Attorney, Agent, or Firm* — Slater Matsil, LLP

(57) ABSTRACT

The present invention discloses a method for transmitting control information. Downlink control information is categorized into common control information and dedicated control information. A physical broadcast channel is extended by dividing a common control channel domain into a plurality of narrowband sub-control channel domains by adding a position identifier. Before a connection is established, the common control information is sent, according to the position identifier, in each sub-control channel domain of the common control channel domain. After the connection is established, a sub-control channel domain with a channel state that complies with a set standard is selected, according to a channel state of each sub-control channel domain, for sending the dedicated control information.

20 Claims, 4 Drawing Sheets

(51) Int. Cl.
*H04W 74/08* (2009.01)
*H04W 72/08* (2009.01)

(58) Field of Classification Search
USPC ........ 370/312, 334, 280, 329, 216, 228, 336
See application file for complete search history.

(56) References Cited

U.S. PATENT DOCUMENTS

| | | | | |
|---|---|---|---|---|
| 2010/0067496 A1* | 3/2010 | Choi | ............... | H04W 52/54 370/336 |
| 2010/0203913 A1 | 8/2010 | Madan et al. | | |
| 2010/0254471 A1* | 10/2010 | Ko | ............... | H04L 5/0023 375/260 |
| 2010/0329196 A1* | 12/2010 | Kwon | ............... | H04J 13/0062 370/329 |
| 2010/0331030 A1* | 12/2010 | Nory | ............... | H04L 5/0053 455/509 |
| 2011/0034177 A1* | 2/2011 | Oh | ............... | H04J 11/0086 455/450 |
| 2011/0045836 A1* | 2/2011 | Hamalainen | ............... | H04W 16/14 455/446 |
| 2011/0085513 A1* | 4/2011 | Chen | ............... | H04W 72/042 370/330 |
| 2011/0092240 A1* | 4/2011 | Aiba | ............... | H04L 1/0025 455/509 |
| 2011/0103509 A1 | 5/2011 | Chen et al. | | |
| 2011/0141996 A1* | 6/2011 | Yamada | ............... | H04W 72/0453 370/329 |
| 2011/0194499 A1* | 8/2011 | Aiba | ............... | H04L 1/1822 370/328 |
| 2011/0274077 A1* | 11/2011 | Yamada | ............... | H04W 72/042 370/329 |
| 2011/0280223 A1* | 11/2011 | Maeda | ............... | H04W 72/082 370/335 |
| 2011/0299489 A1* | 12/2011 | Kim | ............... | H04L 1/0046 370/329 |
| 2012/0014349 A1* | 1/2012 | Chung | ............... | H04B 7/0684 370/329 |
| 2012/0021753 A1* | 1/2012 | Damnjanovic | ............... | H04W 72/082 455/450 |
| 2013/0003604 A1* | 1/2013 | Blankenship | ............... | H04L 5/0053 370/255 |

FOREIGN PATENT DOCUMENTS

| | | |
|---|---|---|
| CN | 101868004 A | 10/2010 |
| EP | 1605726 A2 | 12/2005 |
| EP | 10605726 A2 | 12/2005 |
| EP | 2355605 A1 | 8/2011 |
| JP | 2009512390 A | 3/2009 |
| JP | 2009524976 A | 7/2009 |
| WO | 2007052916 A1 | 5/2007 |
| WO | 2007091795 A1 | 8/2007 |
| WO | 2011044494 A1 | 4/2011 |

OTHER PUBLICATIONS

Alcatel-Lucent, "Considerations on potential solutions for low-cost MTC UEs," 3GPP TSG RAN WG1 Meeting #66bis, R1-113334, Zhuhai, China, Oct. 10-14, 2011, 4 pages.

* cited by examiner

METHOD FOR TRANSMITTING CONTROL INFORMATION

This application is a continuation of International Application No. PCT/CN2012/084189, filed on Nov. 7, 2012, which claims priority to Chinese Patent Application No. 201110348298.1, filed on Nov. 7, 2011, both of which are hereby incorporated by reference in their entireties.

TECHNICAL FIELD

The present invention relates to the field of communications technologies and, in particular embodiments, to a method for transmitting control information.

BACKGROUND

With the development of application of the Internet of Things, the number of used Internet of Things devices increases constantly and rapidly. As an important connection link for bearing data communication between the Internet of Things devices, a communications network bears a constantly increasing amount of data and a constantly increasing number of service types.

During the development process of the Internet of Things, to decrease a cost of Internet of Things terminals to accelerate popularization of the Internet of Things, an operator proposes a concept of a low cost terminal in a long term evolution (LTE) conference of the third generation partnership project (3GPP).

A low cost terminal only supports small bandwidth, such as 1.4 M, and therefore may also be called a narrowband user terminal. The low cost terminal can largely save a cost of an Internet of things terminal. For most Internet of things devices, small bandwidth can meet their needs of data transmission. Therefore, an Internet of things terminal, as a low cost terminal, can largely decrease a device cost without affecting communication, and it can be further predicted that the low cost terminal has a bright prospect in the Internet of things.

In the prior art, there is a technical solution that a position of a new downlink narrowband control channel domain is notified by using a physical broadcast channel (PBCH) for a low cost terminal to use, so that the low cost terminal only occupies a part of a frequency band of a broadband when performing broadband access, so as to save bandwidth and reduce receiving and processing complexity.

However, the inventor finds in researches that although many Internet of Things services only require a low transmission rate, control information of the services has a high priority. Particularly, sending and receiving conditions of downlink control information may directly affect system performance. Physical resource blocks (PRB) in a narrowband system in the prior art have a small frequency interval and high relevance, and may be in deep fading at the same time. As a result, control information transmitted in the narrowbands cannot be accurately received or sent by some terminals in deep fading. Therefore, the prior art at least has a defect. In that a control channel of a low cost terminal has poor reliability of control information transmission, thereby affecting system performance.

SUMMARY OF THE INVENTION

In view of this, embodiments of the present invention provide a method for sending downlink narrowband control information in a broadband system, where a sub-control channel domain with a good channel state is selected to send the control information, thereby improving reliability of control information transmission on a control channel for a low cost terminal.

Therefore, an embodiment of the present invention provides a method for transmitting control information. Downlink control information is categorized into common control information and dedicated control information. A physical broadcast channel is extended by dividing a common control channel domain into a plurality of narrowband sub-control channel domains by adding a position identifier used for indicating a time-frequency position of the common control channel domain. Before a connection is established, the common control information in each sub-control channel domain of the common control channel domain is sent according to the position identifier. A random access resource dedicated for a narrowband user terminal is allocated and the narrowband user terminal in system information is notified. After the connection is established, according to a channel state of each sub-control channel domain, a sub-control channel domain with a channel state that complies with a set standard is selected for sending the dedicated control information and a channel instruction is sent. The channel instruction is information used by a base station to instruct, according to the channel state of each sub-control channel domain, the narrowband user terminal to select a sub-control channel domain that complies with the set standard.

In addition, an embodiment of the present invention further provides another method for transmitting control information. An extended physical broadcast channel and common control information are received according to a preset position identifier. A random access resource is sent. After a connection is established with a network, a channel quality state is reported a channel instruction is obtained and a corresponding sub-control channel domain is listened to according to the channel instruction. The position identifier is a position identifier added by a base station by extending a physical broadcast channel and used for indicating a time-frequency position of a common control channel domain, so as to divide the common control channel domain into a plurality of narrowband sub-control channel domains. The channel instruction is information used by the base station to instruct, by extending the physical broadcast channel and according to the channel state of each sub-control channel domain, a narrowband user terminal to select a sub-control channel domain.

To sum up, in the technical solutions provided by the embodiments of the present invention, a channel state selection scheme is set, so that when sending downlink control information to a narrowband user terminal, a base station selects a sub-control channel domain with good connection quality and low load and instructs the narrowband user terminal to select a sub-control channel domain that complies with a set standard, thereby effectively improving reliability of control information transmission on a control channel for the narrowband user terminal.

DETAILED DESCRIPTION OF ILLUSTRATIVE EMBODIMENTS

Embodiments of the present invention provide a method for transmitting control information, which is described in the following with reference to the embodiments.

Figure 1:
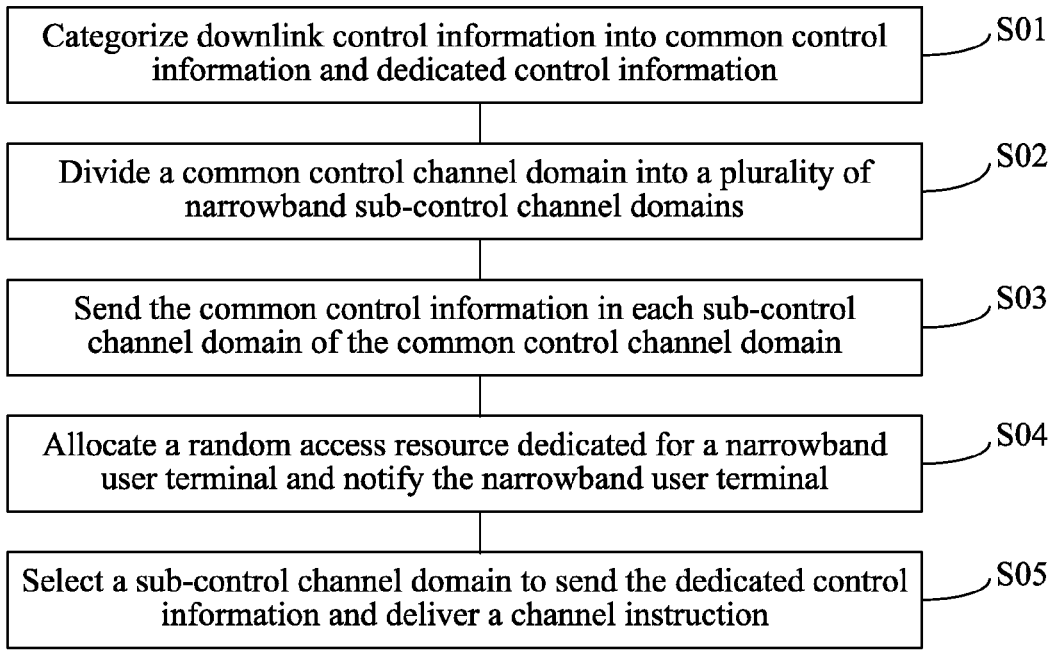
FIG. 1 is a schematic flowchart of a method for transmitting control information according to an embodiment of the present invention.

In the embodiments, a mentioned low cost terminal is a narrowband user terminal that emerges to save broadband network bandwidth occupied by a terminal. To improve reliability of control information transmission on a control channel for the narrowband user terminal, referring to FIG. 1, a first embodiment of the present invention provides a method for transmitting control information.

S01: Categorize downlink control information into common control information and dedicated control information.

Figure 7:
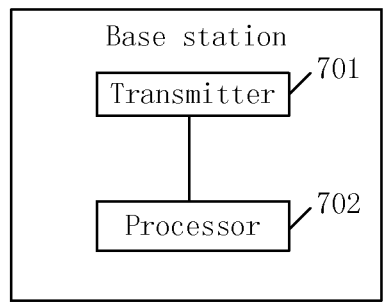
FIG. 7 is a simplified block diagram of a base station according to an embodiment of the present invention.

In a base station shown as FIG. 7, to use different operation methods for different control information, control information needs to be categorized first, and specifically, downlink control information may be categorized into two types: common control information and dedicated control information.

The common control information may specifically include: control information used for scheduling system information (SI), control information used for scheduling a paging message, and a control information RAR message used for scheduling a random access response (RAR) message.

Figure 8:
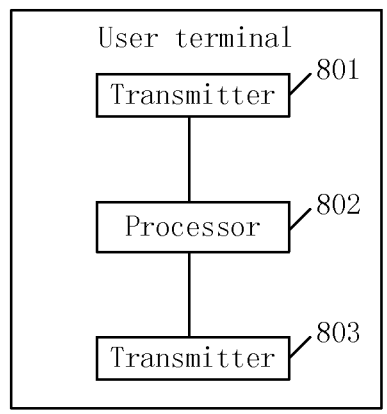
FIG. 8 is a simplified block diagram of a user terminal according to an embodiment of the present invention.

The dedicated control information may specifically include dedicated downlink control information after the narrowband user terminal, shown as FIG. 8, is in a connection state, such as control information of narrowband resource allocation and other control information.

S02: Extend a physical broadcast channel: A common control channel domain includes a plurality of narrowband sub-control channel domains by adding a position identifier used for indicating a time-frequency position of the common control channel domain, where the time-frequency position of the common control channel domain may be a specific time-frequency position, such as a specific subframe or frequency, for example, a time-frequency resource in a subframe of a multimedia broadcast single frequency network (MBMSFN) is provided for the common control channel domain to use.

To enable a plurality of narrowband control channels to work simultaneously in a broadband network, in this embodiment, the common control channel domain is divided into a plurality of narrowband sub-control channel domains. The plurality of sub-control channel domains coexists in a broadband network and therefore need to be distinguished and identified. Therefore, in this embodiment, the physical broadcast channel is extended, and the position identifier used for indicating the time-frequency position of each sub-control channel domain in the common control channel domain is added. In this way, a corresponding sub-control channel domain can be found by using the identifier.

S03: Before a connection is established, send, according to the position identifier, the common control information at a time-frequency position of each sub-control channel domain of the common control channel domain.

Before the connection is established between the base station and the narrowband user terminal, the base station may send, according to the position identifier, the common control information at the time-frequency position of each sub-control channel domain of the common control channel domain.

S04: Allocate a random access resource dedicated for the narrowband user terminal and notify the narrowband user terminal in system information.

The narrowband user terminal is notified of the random access resource in the system information (SI).

The narrowband user terminal obtains the common control information by listening to a sub-control channel domain and obtains the system information, so as to initiate random access to the base station and establish the connection with the base station.

S05: After the connection is established, select, according to a channel state of each sub-control channel domain, a sub-control channel domain with a channel state that complies with a set standard, notify a terminal user of channel instruction information, and send the dedicated control information to the narrowband user terminal in the selected sub-control channel domain.

A channel instruction is information used by the base station to instruct, according to the channel state of each sub-control channel domain, the narrowband user terminal to select a sub-control channel domain.

After the connection is established, the base station may obtain the channel state of each sub-control channel domain, so as to select the sub-control channel domain that complies with the set standard for sending the dedicated control information to the narrowband user terminal. A method of notifying may be notifying through the sub-control channel domain or an RRC message.

Specifically, in this embodiment, the set standard may include a channel priority, channel connection quality, and/or a channel occupation condition. For example, a channel with good connection quality and in an idle state may be selected among all the sub-control channel domains, or a sub-control channel domain with a high priority may be selected.

In addition, the base station further sends the channel instruction to the narrowband user terminal according to the channel state, and the channel instruction may instruct the narrowband user terminal to listen in the sub-control channel domain that complies with the set standard, so that the narrowband user terminal can communicate with the base station in a sub-control channel domain with quality assurance.

In this embodiment, a channel state selection scheme is set, so that when sending downlink control information to a narrowband user terminal, a base station selects a sub-control channel domain with good connection quality and low load and instructs the narrowband user terminal to select a sub-control channel domain that complies with a set standard, thereby effectively improving reliability of control information transmission on a control channel for the narrowband user terminal.

Preferably, in this embodiment, when the physical broadcast channel is extended, a sending manner identifier used for identifying a sending manner of the control information in the common control channel domain may be further included.

To further improve reliability of control information transmission on a control channel for the narrowband user terminal, in this embodiment, a frequency hopping manner may be further used for sending the control information for a plurality of times. Therefore, the sending manner identifier further needs to be added in an extended physical broadcast channel, so as to indicate the frequency hopping manner for the control information.

When the frequency hopping manner is adopted, the sending the common control information at the time-frequency position of each sub-control channel domain of the common control channel domain may specifically be sending, according to the position identifier and in each sub-control channel domain in a time-frequency domain of the common control channel domain, the control information in a sending manner corresponding to the sending manner identifier, so that the narrowband user terminal may receive the control information in a corresponding receiving manner and combine the control information received in a plurality of times, thereby further improving reliability of control information transmission.

Further, in this embodiment, the frequency hopping manner may specifically include: sending the channel information in different timeslots for a plurality of times, or sending the common control information in different sub-control channel domains. In addition, a manner of combining different timeslots and different sub-control channel domains may further be adopted, that is, sending same control information at different time-domain resource positions. The narrowband user terminal repeatedly receives the control information in a corresponding manner and then combines the received control information.

Further, in this embodiment, control information of paging information that is identified as being used for the narrowband user terminal may be sent in a sub-control channel domain corresponding to the user terminal according to a narrowband identifier preset in the paging information, where the narrowband identifier is used for identifying whether the paging information is used for the narrowband user terminal.

Further, in this embodiment, the narrowband identifier may not be added in a paging message, and the control information is sent in a control channel domain of a normal user and a control channel domain corresponding to the narrowband user terminal, so as to ensure receiving of the control information.

After establishing the connection with the base station, the narrowband user terminal further listens to the sub-control channel domain corresponding to the narrowband user terminal in a certain period of time. Therefore, in a case where the narrowband user terminal is still in a connection state, when a message arrives, the base station may send control information corresponding to the message in the corresponding sub-control channel domain according to user terminal information of the narrowband user terminal and information of the sub-control channel domain.

When the narrowband user terminal is in an idle (idle) state, when a paging message arrives, the base station determines whether the paging information is used for the narrowband user terminal according to a narrowband identifier preset in the paging information, and sends the paging information used for the narrowband user terminal in the sub-control channel domain corresponding to the narrowband user terminal.

The narrowband identifier may also not be added in the paging message, and the control information is sent in a control channel domain of a normal user and a control channel domain corresponding to the narrowband user terminal, so as to ensure receiving of the control information.

A correspondence between the narrowband user terminal and the sub-control channel domain may adopt a plurality of manners, where a manner of a mapping between a user identification of the narrowband user terminal and an identifier of the sub-control channel domain may be adopted, and specifically, the common control channel domain including two narrowband sub-control channel domains A and B is used as an example:

if UE_ID mod 2=1:
LUE_ID=(UE_ID+1)/2;
then, the narrowband user terminal listens to the sub-control channel domain A; and
if UE_ID mod 2=0:
then, the narrowband user terminal listens to the sub-control channel domain B;
LUE_ID=UE_ID/2.

A position of a paging subframe in each sub-control channel domain is calculated according to the following method:

SFN mod T=(T/N)*(LUE_ID mod N)
i_s=(LUE_ID/N)mod Ns
T=min(Tc,Tue)
N=min(T, the number of paging subframes in each frame*T)
Ns=max(1, the number of paging subframes in each frame)

SFN (system Frame Number) indicates a system frame number, UE_ID indicates an identifier of a narrowband user terminal, LUE_ID indicates an identifier of a sub-control channel domain, Tc indicates a cell-specific default paging cycle in a unit of radio frame, Tue indicates a narrowband user terminal-specific paging cycle with radio frame, N indicates the number of paging frames in a paging cycle, i_s indicates a pointer pointing to a subframe, and Ns indicates the number of paging subframes in a radio frame for paging. In this way, the paging message is sent in two different sub-control channel domains. Further, to improve transmission reliability of this part of control information, the method may further be modified as:

if UE_ID mod 2=1:
first listening to the sub-control channel domain A, and then listening to the sub-control channel domain B in a next paging subframe; and
if UE_ID mod 2=0:
first listening to the sub-control channel domain B, and then listening to the sub-control channel domain A in a next paging subframe.

A position of a paging subframe in each sub-control channel domain is calculated according to the following method:

SFN mod T=(T/N)*(UE_ID mod N)
i_s=(UE_ID/N)mod Ns
T=min(Tc,Tue)
N=min(T, the number of paging subframes in each frame*T)
Ns=max(1, the number of paging subframes in each frame)

When sending the paging message, the base station first calculates a corresponding paging subframe according to a method in the prior art, then determines a specific sub-control channel domain according to UE_ID to send corresponding control information of the paging message, and sends the control information of the paging message again in another sub-control channel domain of a next paging sub-frame, so as to obtain diversity gain.

Figure 2:
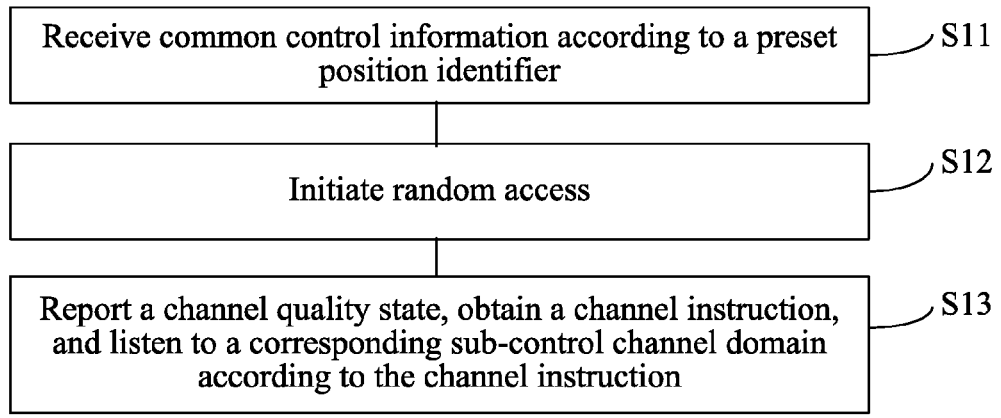
FIG. 2 is a schematic flowchart of another method for transmitting control information according to an embodiment of the present invention.

In an embodiment of the present invention, another method for transmitting control information is further provided, referring to FIG. 2, and includes:

S11: Receive an extended physical broadcast channel, and receive common control information according to a preset position identifier.

By extending a physical broadcast channel, a position identifier used for indicating a time-frequency position of a common control channel domain is added, so as to divide the common control channel domain into a plurality of narrowband sub-control channel domains. Therefore, the common control information may be received according to the preset position identifier, that is to say, the common control information is received in a preset sub-control channel domain, so as to obtain system information.

S12: Initiate random access.

A narrowband user terminal obtains the common control information by listening to a sub-control channel domain and further obtains the system information, so as to establish a connection with the base station by initiating random access to the base station.

S13: After a connection is established with a network, report a channel state, obtain a channel instruction, and listen to a corresponding sub-control channel domain according to the channel instruction.

The narrowband user terminal may obtain a channel state of each sub-control channel domain, and after the channel state is reported, the base station may select a sub-control channel domain that complies with a set standard to send control information to the narrowband user terminal.

Specifically, in this embodiment, the set standard may include a channel priority, channel connection quality, and/or a channel occupation condition. For example, a channel with good connection quality and in an idle state may be selected among all the sub-control channel domains, or a sub-control channel domain with a high priority may be selected.

In this embodiment, the channel instruction is information used by the base station to instruct, according to the channel state of each sub-control channel domain that is reported by the narrowband user terminal, the narrowband user terminal to select a sub-control channel domain.

Therefore, the base station may further send the channel instruction to the narrowband user terminal according to the channel state, and the channel instruction may instruct the narrowband user terminal to listen in the sub-channel control domain that complies with the set standard, so that the narrowband user terminal can communicate with the base station in a sub-control channel domain with quality assurance.

The channel instruction in this embodiment may be notified by using the sub-control channel domain listened to by the narrowband user terminal or by using an RRC message.

In this embodiment, a channel state selection scheme is set, so that when sending downlink control information to a narrowband user terminal, a base station selects a sub-control channel domain with good connection quality and low load and instructs the narrowband user terminal to select a sub-control channel domain that complies with a set standard, thereby effectively improving reliability of control information transmission on a control channel for the narrowband user terminal.

Further, in the embodiment of the present invention, a part of content may be further added in system broadcast information, including grouping random access resources, and establishing a resource-channel mapping between each random access resource group and each sub-control channel domain. The narrowband user terminal is notified of the resource-channel mapping in a sending manner, and the random access resources include a time-frequency resource and a signature sequence that are for random access.

In this way, when initiating random access, the narrowband user terminal may select, according to a channel condition and/or a priority of each sub-control channel domain in the common control channel domain, a random access resource corresponding to a sub-control channel domain to initiate random access, and listen to the sub-control channel domain. The base station may determine, according to a random access resource occupied by a received random access request, the sub-control channel domain selected by the narrowband user terminal, and send the control information in the sub-control channel domain.

Figure 3:
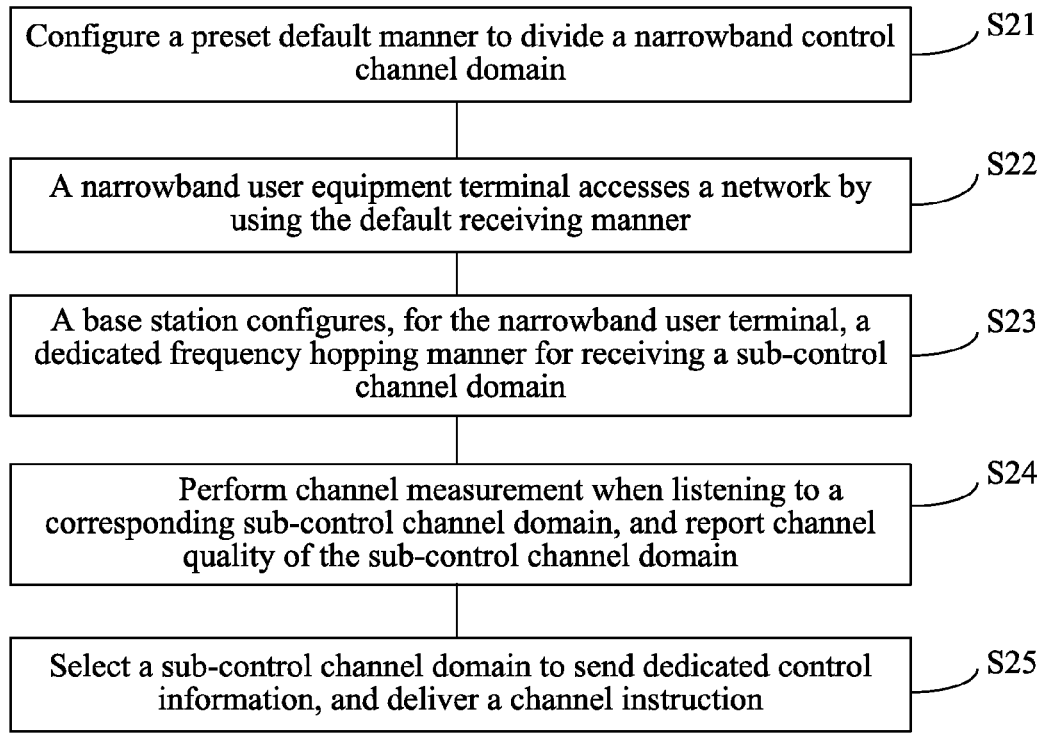
FIG. 3 is a schematic flowchart of another method for transmitting control information according to an embodiment of the present invention.

Further, referring to FIG. 3, another embodiment of the present invention may further be:

S21: A base station first configures a preset default manner to divide a narrowband control channel domain, where the preset default manner includes a default time-frequency position of each sub-control channel domain, that is, presets a position identifier of each sub-control channel domain.

S22: A narrowband user equipment terminal accesses a network by using the default receiving manner.

S23: The base station configures, for the narrowband user terminal, a dedicated frequency hopping manner for receiving a sub-control channel domain.

S24: The narrowband user terminal performs channel measurement when listening to a corresponding sub-control channel domain and reports channel quality of the sub-control channel domain.

Figure 4:
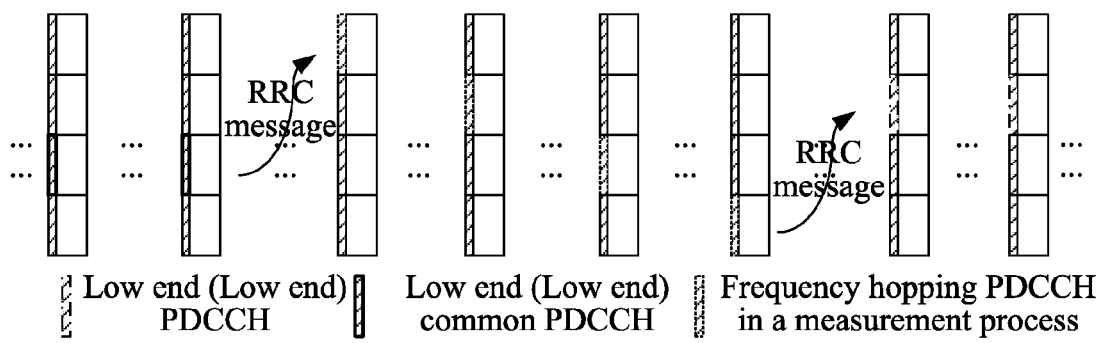
FIG. 4 is a schematic diagram of a manner of notifying by using an RRC message according to an embodiment of the present invention.

S25: After receiving a corresponding channel quality report, the base station side selects a sub-control channel domain with good channel quality to send new control information, and notifies a corresponding narrowband user terminal of a position identifier of the new sub-control channel domain, that is, sends a channel instruction to the narrowband user terminal. The new sub-channel control domain may also adopt a working manner of frequency hopping between a plurality of sub-control channels. A manner of notifying the narrowband user terminal of a change of the sub-control channel domain may be notifying by using a default PDCCH, or by using an RRC message (for example, RRCConnectionSetup, RRCConnectionReconfiguration, and RRCConnectionReestablishment). FIG. 4 shows a manner of notifying by using an RRC message.

In this embodiment, a downlink channel quality report may also be replaced with a mapping between a random access resource and a sub-control channel domain.

Figure 5:
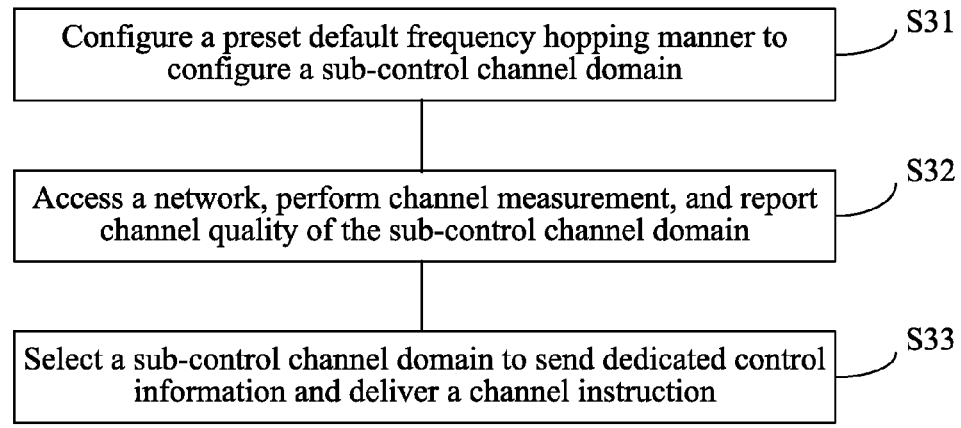
FIG. 5 is a schematic flowchart of another method for transmitting control information according to an embodiment of the present invention.

Further, referring to FIG. 5, another embodiment of the present invention may further be:

S31: A base station first configures a default frequency hopping manner to configure a sub-control channel domain.

S32: A narrowband user terminal accesses a network by using the default frequency hopping manner, performs channel measurement when listening to the sub-control channel domain by frequency hopping, and reports corresponding channel quality.

Figure 6:
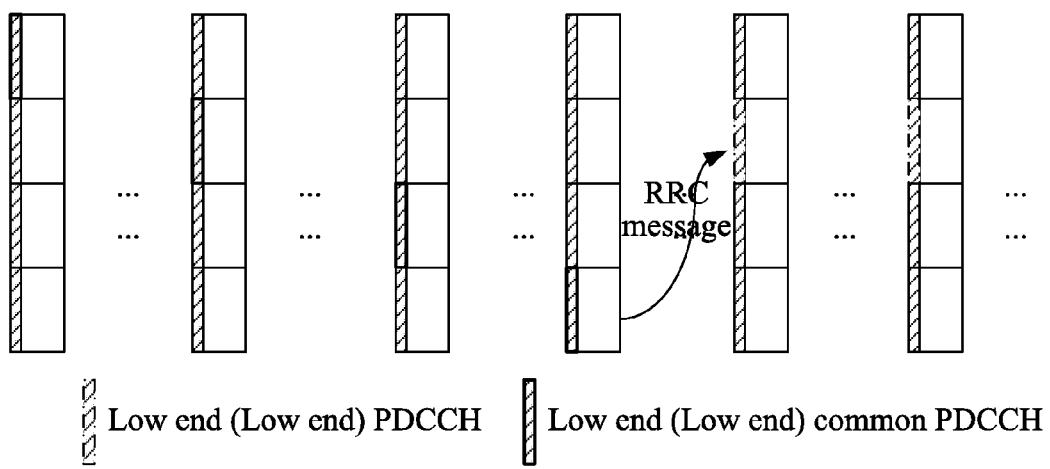
FIG. 6 is a schematic diagram of another manner of notifying by using an RRC message according to an embodiment of the present invention.

S33: After receiving a corresponding channel quality report, the base station selects a sub-control channel domain with good channel quality to send new control information, and notifies a corresponding narrowband user terminal of position information of the new sub-control channel domain. The new sub-channel control domain may also adopt a working manner of frequency hopping between a plurality of sub-control channels. A manner of notifying the narrowband user terminal of a change of the sub-control channel domain may be notifying by using a default PDCCH, or by using an RRC message (for example, RRCConnectionSetup, RRCConnectionReconfiguration, and RRCConnectionReestablishment). FIG. 6 shows a manner of notifying by using an RRC message.

In this embodiment, a downlink channel quality report may also be replaced with a mapping between a random access resource and a sub-control channel domain.

Finally, it should be noted that the foregoing embodiments are merely intended for describing the technical solutions of the embodiments of the present invention rather than limiting the present invention. Although the embodiments of the present invention are described in detail with reference to the foregoing embodiments, persons of ordinary skill in the art should understand that they may still make modifications to the technical solutions described in the foregoing embodiments or make equivalent replacements to some technical features of the technical solutions. However, these modifications or replacements do not make the essence of the technical solutions depart from the spirit and scope of the technical solutions of the embodiments of the present invention.

What is claimed is:

1. A method for transmitting control information, the method comprising:
   categorizing downlink control information into common control information and dedicated control information;
   before a connection is established between a network and a first narrowband user terminal of a plurality of narrowband user terminals, sending, by a base station, according to a position identifier in a physical broadcast channel, the common control information in each of a plurality of narrowband sub-control channel domains of a common control channel domain, wherein the physical broadcast channel is extended by adding the position identifier used for indicating a time-frequency position of the common control channel domain, and the common control channel domain is divided into the plurality of narrowband sub-control channel domains, wherein the common control channel domain is an allocated time-frequency resource of a first size, and each of the plurality of the narrowband sub-control channel domains is an allocated time-frequency resource having a size that is smaller than the first size, the common control channel domain encompassing the plurality of the narrowband sub-control channel domains, and wherein the common control channel domain carries control information that is common to the plurality of narrowband user terminals;
   allocating, by the base station, a random access resource dedicated for the first narrowband user terminal;
   notifying the first narrowband user terminal in system information;
   after the connection is established, selecting, by the base station according to a channel state of each of the narrowband sub-control channel domains, a narrowband sub-control channel domain with a channel state that complies with a set standard, for sending dedicated control information;
   sending, by the base station, a channel instruction, wherein the channel instruction is information used by the base station to instruct, according to the channel state of the each of the narrowband sub-control channel domains, the first narrowband user terminal to select the narrowband sub-control channel domain that complies with the set standard; and
   sending, by the base station, the dedicated control information to the first narrowband user terminal using the selected narrowband sub-control channel domain of the common control channel domain.

2. The method according to claim 1, further comprising sending, according to a narrowband identifier preset in a paging message, control information of the paging message used for the first narrowband user terminal in a narrowband sub-control channel domain corresponding to the first narrowband user terminal, wherein the narrowband identifier is used for identifying whether the paging message is used for the first narrowband user terminal.

3. The method according to claim 1, further comprising sending control information of a paging message in both the common control channel domain corresponding to the first narrowband user terminal and a control channel domain corresponding to a normal user terminal.

4. The method according to claim 1,
   wherein the physical broadcast channel further comprises a sending manner identifier used for identifying a sending manner of the control information in the common control channel domain; and
   wherein sending the common control information in the each of the plurality of the narrowband sub-control channel domains of the common control channel domain comprises sending, through the common control channel domain and according to the position identifier, the common control information in the each of the plurality of the narrowband sub-control channel domains in the sending manner corresponding to the sending manner identifier.

5. The method according to claim 4, wherein the sending manner comprises a frequency hopping manner.

6. The method according to claim 5, wherein the frequency hopping manner comprises:
   sending the common control information in a plurality of timeslots for a plurality of times.

7. The method according to claim 2, wherein the narrowband sub-control channel domain corresponds to the first narrowband user terminal when a mapping is established between a user identifier of the first narrowband user terminal and an identifier of the corresponding narrowband sub-control channel domain, and the first narrowband user terminal corresponds to the narrowband sub-control channel domain according to the mapping.

8. The method according to claim 1, wherein the physical broadcast channel is further extended by grouping random access resources, and establishing a resource-channel mapping between each random access resource group and the each of the plurality of the narrowband sub-control channel domains, wherein the first narrowband user terminal is notified of the resource-channel mapping in a sending manner, and the random access resources comprise a time-frequency resource and a signature sequence that are for random access.

9. A method for transmitting control information, the method comprising:

receiving, by a first narrowband user terminal of a plurality of narrowband user terminals, an extended physical broadcast channel, wherein the physical broadcast channel is extended by adding, by a base station, a position identifier indicating a time-frequency position of a common control channel domain, wherein the common control channel domain is divided into a plurality of narrowband sub-control channel domains, wherein the common control channel domain is an allocated time-frequency resource of a first size, and each of the plurality of the narrowband sub-control channel domains is an allocated time-frequency resource having a size that is smaller than the first size, the common control channel domain encompassing the plurality of the narrowband sub-control channel domains, and wherein the common control channel domain carries control information that is common to the plurality of narrowband user terminals;

receiving, by the first narrowband user terminal, common control information on the common control channel domain according to the position identifier;

initiating random access by the first narrowband user terminal; and after a connection is established between the first narrowband user terminal and a network, reporting, by the first narrowband user terminal, a channel quality state, and obtaining, by the first narrowband user terminal, a channel instruction, wherein the channel instruction is information used by the base station to instruct, according to a channel state of the each of the plurality of the narrowband sub-control channel domains, the first narrowband user terminal to select a narrowband sub-control channel domain of the plurality of the narrowband sub-control channel domains of the common control channel domain; and receiving, by the first narrowband user terminal on the selected narrowband sub-control channel domain of the common control channel domain, dedicated control information from the base station.

10. The method according to claim 9, further comprising, when establishing the connection with the network:

obtaining a resource-channel mapping; and selecting, according to the channel state of the each of the narrowband sub-control channel domains, a corresponding random access resource to initiate random access, wherein the resource-channel mapping is established between each random access resource group and the each of the plurality of narrowband sub-control channel domains by the base station by extending the physical broadcast channel and grouping random access resources; and wherein the first narrowband user terminal is notified of the resource-channel mapping in a sending manner and the random access resources comprise a time-frequency resource and a signature sequence that are for the random access.

11. A base station, comprising:

a processor, which is configured to:

categorize downlink control information into common control information and dedicated control information; and a transmitter, which is configured to, before a connection is established between a first narrowband user terminal of a plurality of narrowband user terminals and a network, send, according to a position identifier in a physical broadcast channel, the common control information in each of a plurality of narrowband sub-control channel domains of a common control channel domain, wherein the physical broadcast channel is extended by adding the position identifier for indicating a time-frequency position of the common control channel domain, and the common control channel domain is divided into the plurality of narrowband sub-control channel domains, wherein the common control channel domain is an allocated time-frequency resource of a first size, and each of the plurality of narrowband sub-control channel domains is an allocated time-frequency resource having a size that is smaller than the first size, the common control channel domain encompassing the plurality of narrowband sub-control channel domains, and wherein the common control channel domain carries control information that is common to the plurality of narrowband user terminals;

wherein the processor is further configured to allocate a random access resource dedicated for the first narrowband user terminal, to notify the first narrowband user terminal in system information, and after the connection is established, to select, according to a channel state of the each of the plurality of the narrowband sub-control channel domains, a narrowband sub-control channel domain with a channel state that complies with a set standard, for sending dedicated control information;

wherein a channel instruction is used by the base station to instruct, according to the channel state of the each of the plurality of the narrowband sub-control channel domains, the first narrowband user terminal to select the narrowband sub-control channel domain that complies with the set standard; and wherein the processor is further configured to send the dedicated control information to the first narrowband user terminal using the selected narrowband sub-control channel domain of the common control channel domain.

12. The base station according to claim 11, which the transmitter is further configured to send, according to a narrowband identifier preset in a paging message, control information of the paging message used for the first narrowband user terminal in a narrowband sub-control channel domain corresponding to the first narrowband user terminal; and wherein the narrowband identifier is used for identifying whether the paging message is used for the first narrowband user terminal.

13. The base station according to claim 11, wherein the transmitter is further configured to send control information of a paging message in both the common control channel domain corresponding to the first narrowband user terminal and a control channel domain corresponding to a normal user terminal.

14. The base station according to claim 11, wherein the physical broadcast channel further comprises a sending manner identifier used for identifying a sending manner of the control information in the common control channel domain; and wherein the transmitter in sending the common control information in the each of the plurality of the narrowband sub-control channel domains of the common control channel domain is configured to send, through the common control channel domain and according to the position identifier, the common control information in the each of the plurality of the narrowband sub-control channel domains in the sending manner corresponding to the sending manner identifier.

15. The base station according to claim 14, wherein the sending manner comprises a frequency hopping manner.

16. The base station according to claim 15, wherein the frequency hopping manner comprises:
sending the common control information in a plurality of timeslots for a plurality of times.

17. The base station according to claim 12, wherein the narrowband sub-control channel domain corresponds to the first narrowband user terminal when a mapping is established between a user identifier of the first narrowband user terminal and an identifier of the corresponding narrowband sub-control channel domain, and the first narrowband user terminal corresponds to the narrowband sub-control channel domain according to the mapping.

18. The base station according to claim 11, wherein the physical broadcast channel is further extended by:
grouping random access resources, and establishing a resource-channel mapping between each random access resource group and each of the plurality of narrowband sub-control channel domains,
wherein the first narrowband user terminal is notified of the resource-channel mapping in a sending manner, and the random access resources comprise a time-frequency resource and a signature sequence that are for random access.

19. A first narrowband user terminal, comprising:
a transmitter;
a receiver, configured to:
receive an extended physical broadcast channel, wherein the physical broadcast channel is extended by adding, by a base station, of a position identifier indicating a time-frequency position of a common control channel domain, wherein the common control channel domain is divided into a plurality of narrowband sub-control channel domains, wherein the common control channel domain is an allocated time-frequency resource of a first size, and each of the plurality of the narrowband sub-control channel domains is an allocated time-frequency resource having a size that is smaller than the first size, and wherein the common control channel domain carries control information that is common to a plurality of narrowband user terminals; and
to receive common control information on the common control channel domain according to a preset position identifier; and
a processor coupled to the transmitter and the receiver and configured to:
initiate random access; and
after a connection is established with a network, to control the receiver to report a channel quality state, to obtain a channel instruction, wherein the channel instruction is information that instructs, according to a channel state of each of the plurality of narrowband sub-control channel domains, the first narrowband user terminal to select a narrowband sub-control channel domain of the common control channel domain;
wherein the receiver is further configured to receive, on the selected narrowband sub-control channel domain of the common control channel domain, dedicated control information from the base station.

20. The first narrowband user terminal according to claim 19, wherein the processor is further configured to, when establishing the connection with the network, obtain a resource-channel mapping and select, according to the channel state of the each of the plurality of narrowband sub-control channel domains, a corresponding random access resource to initiate random access, wherein the resource-channel mapping is established between each random access resource group and each of the plurality of narrowband sub-control channel domains by the base station by extending the physical broadcast channel and grouping random access resources and the first narrowband user terminal is notified of the resource-channel mapping in a sending manner, and the random access resources comprise a time-frequency resource and a signature sequence that are for the random access.

* * * * *